United States Patent
Chen et al.

(10) Patent No.: US 12,552,747 B2
(45) Date of Patent: Feb. 17, 2026

(54) AMINO ACID DERIVATIVE CONTAINING NON-STEROIDAL ANTI-INFLAMMATORY DRUG STRUCTURE AND PREPARATION METHOD AND APPLICATION THEREOF

(71) Applicant: JIANGSU PROTELIGHT PHARMACEUTICAL & BIOTECHNOLOGY CO., LTD., Jiangyin (CN)

(72) Inventors: Yuxin Chen, Jiangyin (CN); Mingxia Chen, Jiangyin (CN); Ying Lv, Jiangyin (CN); Gang Dong, Jiangyin (CN); Xiaoxue Huang, Jiangyin (CN)

(73) Assignee: JIANGSU PROTELIGHT PHARMACEUTICAL & BIOTECHNOLOGY CO., LTD., Jiangyin (CN)

( * ) Notice: Subject to any disclaimer, the term of this patent is extended or adjusted under 35 U.S.C. 154(b) by 609 days.

(21) Appl. No.: 17/998,048

(22) PCT Filed: May 7, 2021

(86) PCT No.: PCT/CN2021/092022
§ 371 (c)(1),
(2) Date: Nov. 7, 2022

(87) PCT Pub. No.: WO2021/227938
PCT Pub. Date: Nov. 18, 2021

(65) Prior Publication Data
US 2023/0167059 A1    Jun. 1, 2023

(30) Foreign Application Priority Data
May 9, 2020   (CN) .......................... 202010386293.7

(51) Int. Cl.
| C07D 211/58 | (2006.01) |
| A61P 35/00 | (2006.01) |
| C07D 401/12 | (2006.01) |

(52) U.S. Cl.
CPC ............ *C07D 211/58* (2013.01); *A61P 35/00* (2018.01); *C07D 401/12* (2013.01)

(58) Field of Classification Search
CPC ...... C07D 211/58; C07D 401/12; A61P 35/00
See application file for complete search history.

(56) References Cited

U.S. PATENT DOCUMENTS 8,575,170 B2 * 11/2013 Gera .................. A61P 35/00
                                                    514/331

FOREIGN PATENT DOCUMENTS

CN       107382827 A  * 11/2017  ........... C07D 211/58

OTHER PUBLICATIONS

International Search Report issued in International Application No. PCT/CN2021/092022, mailed Aug. 6, 2021; 8 pgs.

* cited by examiner

*Primary Examiner* — Joseph K Mckane
*Assistant Examiner* — Quincy Mckoy
(74) *Attorney, Agent, or Firm* — HAUPTMAN HAM, LLP

(57) ABSTRACT

The present invention discloses an amino acid derivative containing a non-steroidal anti-inflammatory drug structure and a preparation method and application thereof. The structural formula of the derivative is as represented by formula I. The novel compound has a broad-spectrum anti-tumor effect, can prolong the survival period of tumor patients, and improve the quality of life of tumor patients.

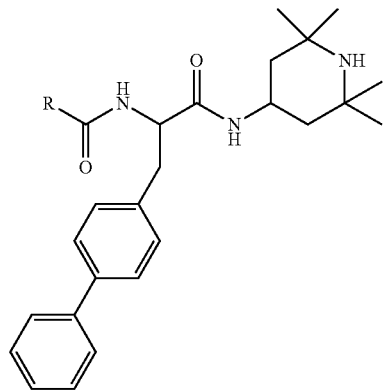

(Formula I)

12 Claims, 4 Drawing Sheets

AMINO ACID DERIVATIVE CONTAINING NON-STEROIDAL ANTI-INFLAMMATORY DRUG STRUCTURE AND PREPARATION METHOD AND APPLICATION THEREOF

RELATED APPLICATIONS

The present application is a U.S. National Phase of International Application Number PCT/CN2021/092022, filed May 7, 2021, and claims priority to Chinese Application Number 202010386293.7, filed May 9, 2020.

FIELD OF THE INVENTION

The present invention belongs to the field of medicine, and in particular relates to an amino acid derivative containing a non-steroidal anti-inflammatory drug structure and a preparation method and application thereof.

BACKGROUND OF THE INVENTION

Bradykinin is a potential inflammatory peptide, which is a vasoactive substance produced by high molecular weight kininogen under the action of kallikrein. It functions its role primarily through autocrine-paracrine mechanisms in the form of local hormones that bind to bradykinin receptors, including vasodilation, smooth muscle spasm, edema, pain and hyperalgesia. Studies have shown that bradykinin is an important growth factor in many cancers, such as lung cancer, liver cancer, prostate cancer, breast cancer, etc. It not only stimulates cancer cell growth directly, but also stimulates cancer migration and invasion by stimulating matrix metalloproteinase (MMP) active enzymes. In addition, in tumors, bradykinin stimulates neovascularization mainly by stimulating the secretion of vascular endothelial growth factor. Together, these activities promote the growth and aggressiveness of certain tumor types.

PL-AC-15 is an amino acid derivative (see Chinese patent CN107382827A) provided by Jiangsu ProteLight Pharmaceutical Biotechnology Co., Ltd. It has good anti-tumor effect. On this basis, it is expected to obtain compounds with better anti-tumor effects through further structural modification.

SUMMARY OF THE INVENTION

An object of the present invention is to provide an amino acid derivative containing a non-steroidal anti-inflammatory drug structure and a pharmaceutically acceptable salt, ester, solvate or isomer thereof (including a stereoisomer, an enantiomer, a tautomer or a mixture thereof).

The structural formula of the amino acid derivative containing the non-steroidal anti-inflammatory drug structure provided by the present invention is represented by formula I:

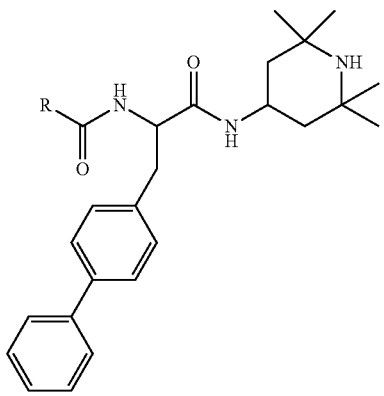

(Formula I)

wherein, R is selected from a group represented by any one of the following formulae a-f, or a group in which the hydrogen on the formula a-f is optionally substituted by one or more R1;

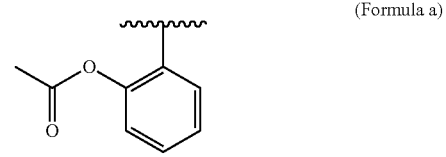

(Formula a)

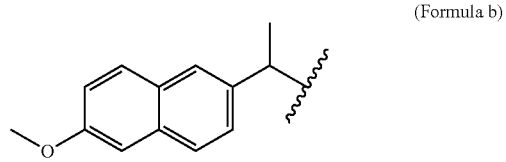

(Formula b)

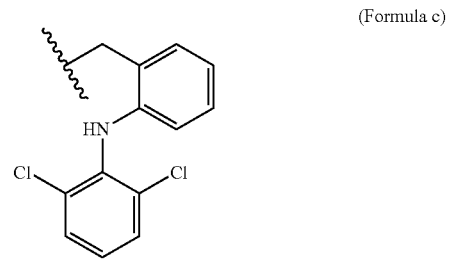

(Formula c)

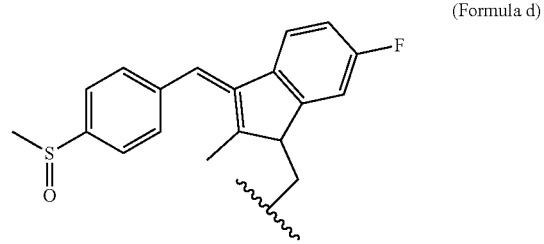

(Formula d)

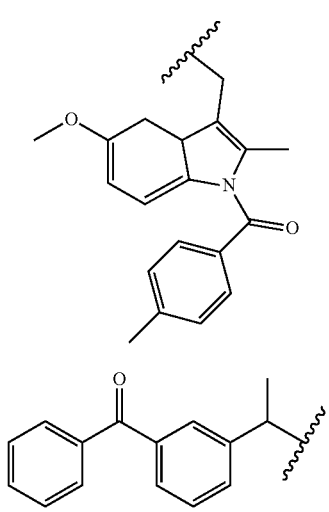

(Formula e)

(Formula f)

R1 is independently selected from any one of the following groups: halogen, C1-8 alkyl, C2-8 alkenyl, C2-8 alkynyl, C3-12 cycloalkyl, C6-12 aryl, 3-12-membered heteroalicyclic, 5-12-membered heteroaryl, —CN, —C(=O)R2, —C(=O)OR2, —C(=O)NR3R4, —NO₂, —NR3R4, —NR5C(=O)R2, —NR5C(=O)OR6, —NR5C(=O)NR3R4, —NR5S(=O)₂R6, —NR5S(=O)₂R3R4, —OR2, —OCN, —OC(=O)R2, —OC(=O)NR3R4, —OC(=O)OR2, —OC(=O)NR3R4, —S(=O)mR2, —S(=O)2NR3R4, R1 groups on adjacent atoms can combine to form C3-12 cycloalkyl, C6-12 aryl, 3-12 membered heteroalicyclic and 5-12 membered aromatic heterocycle, and the hydrogen on R1 can be optionally substituted by R7;

R2, R3, R4, R5 and R6 are independently selected from any one of the following groups: H, halogen, C1-8 alkyl, C2-8 alkenyl, C2-8 alkynyl, C3-12 cycloalkyl, C6-12 aryl, 3-12-membered heteroalicyclic, 5-12-membered heteroaryl; or any two of R2, R3, R4, R5 and R6 bound to the same nitrogen atom can combine with the nitrogen to which they are bound to form a 3-12 membered heteroalicyclic or 5-12 membered heteroaryl, in which optionally contain 1 to 3 heteroatoms selected from N, O and S in addition to the bound nitrogen; or any combination of R2, R3, R4, R5 and R6 bound to the same carbon atom to form a C3-12 cycloalkyl, C6-12 aryl, 3-12 membered heteroalicyclic or 5-12 membered heteroaryl and each hydrogen in R2, R3, R4, R5 and R6 is optionally substituted by R8, or two hydrogen atoms on the same carbon atom in R2, R3, R4, R5 and R6 are optionally oxo substituents;

R7 can be independently selected from halogen, C1-8 alkyl, C2-8 alkenyl, C2-8 alkynyl, C3-12 cycloalkyl, C6-12 aryl, 3-12 membered heteroalicyclic, 5-12-membered heteroaryl, —CN, —C(=O)R10, —C(=O)OR10, —C(=O)NR11R12, —NO₂, —NR11R12, —NR13C(=O)R10, —NR13C(=O)OR14, —NR13C(=O)NR11R12, —NR13S(=O)₂R14, —NR13S(=O)2NR11R12, —OR10, =O, —OC(=O)R10, —OC(=O)NR11R12, —S(=O)mR10 and —S(=O)₂NR11R12, and the hydrogen on R7 can be optionally substituted by R9;

R10, R11, R12, R13, and R14 are independently selected from any of the following groups: H, C1-8 alkyl, C2-8 alkenyl, C2-8 alkynyl, C3-12 cycloalkyl, C6-12-aryl, 3-12-membered heteroalicyclic, 5-12-membered heteroaryl, and each hydrogen in R10, R11, R12, R13, R14 is optionally substituted with the following groups: halogen, —OH, —CN, —C1-5 alkyl which can be partially or fully halogenated;

R8 and R9 can be independently selected from any of the following groups: halogen, C1-8 alkyl, C2-8 alkenyl, C2-8 alkynyl, C3-12 cycloalkyl, C6-12 aryl, 3-12-membered heteroalicyclic, 5-12-membered heteroaryl, —CN, —C(=O)(CH₂)nCH₃, —C(=O)O(CH₂)nCH₃, —C(=O)N[(CH₂)nCH₃]2, —C(=O)OH, —C(=O)NH₂, —C(=O)NH(CH₂)nCH₃, —NO₂, —NH₂, —NH(CH₂)nCH₃, —N[(CH₂)nCH₃]₂, —NHC(=O)(CH₂)nCH₃, —NHS(=O)₂(CH₂)nCH₃, —OH, —OC(CH₂)nCH₃, =O, —OC(=O)(CH₂)nCH₃, —S(=O)(CH₂)nCH₃, —OS(=O)(CH₂)nCH₃ and —S(=O)2N[(CH₂)nCH₃]₂;

m is selected from 0, 1 or 2;

n is selected from 0, 1, 2, 3, 4 or 5.

In some of these embodiments, the amino acid derivative containing the non-steroidal anti-inflammatory drug structure of the present invention can be listed in the following structures, but are not limited to the following structures:

Compound PL-AC-201, whose chemical structure is:

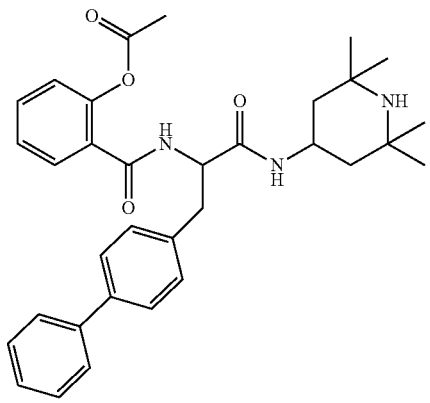

(Formula I-1)

Compound PL-AC-202, whose chemical structure is:

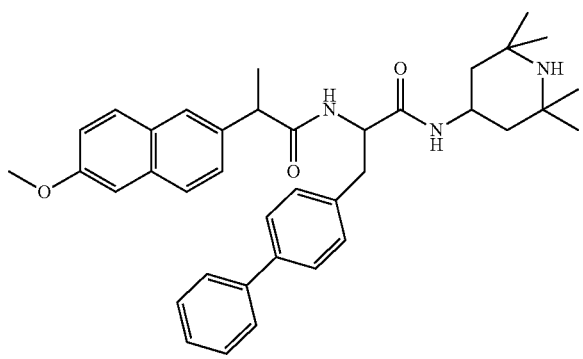

(Formula I-2)

Compound PL-AC-203, whose chemical structure is:

(Formula I-3)

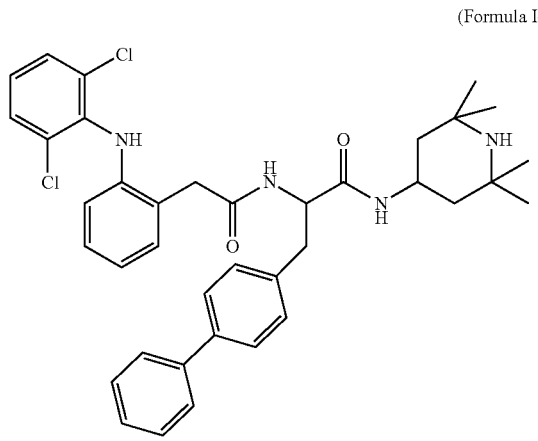

Compound PL-AC-204, whose chemical structure is:

(Formula I-4)

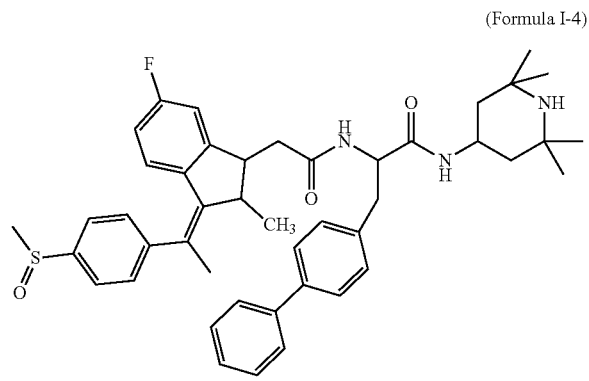

Compound PL-AC-205, whose chemical structure is:

(Formula I-5)

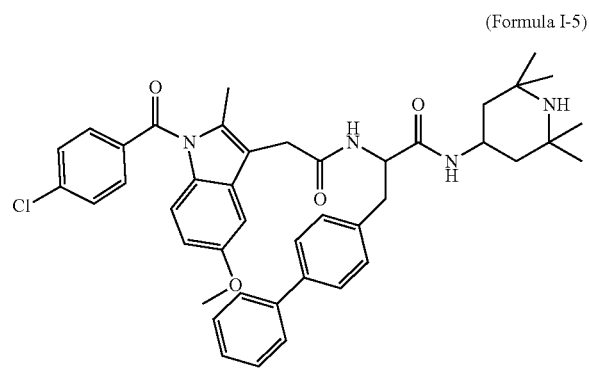 [SMILES: COc1ccc2c(c1)c(CC(=O)NC(Cc1ccc(-c3ccccc3)cc1)C(=O)NC1CC(C)(C)NC(C)(C)C1)c(C)n2C(=O)c1ccc(Cl)cc1]

Compound PL-AC-206, whose chemical structure is:

(Formula I-6)

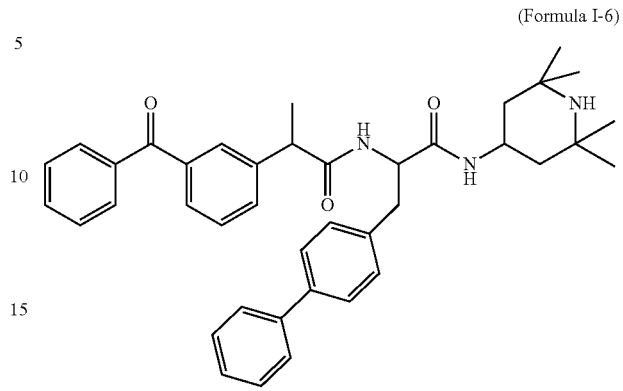

The term "alkyl" as used in the present invention refers to a group consisting only of carbon atoms and hydrogen atoms without unsaturation (e.g., double bonds, triple bonds or rings), which covers various possible geometrically isomeric group and stereoisomeric group. This group is attached to the rest of the molecule by a single bond. As non-limiting examples of alkyl groups, one can list the following straight-chain or branched groups: methyl, ethyl, n-propyl, isopropyl, n-butyl, iso-butyl, sec-butyl, tert-butyl, n-pentyl and its other seven isomers, n-hexyl and its other sixteen isomers, n-heptyl and its various isomers, n-octyl and its various isomers, n-nonyl and its various isomers, n-decyl and its various isomers.

The term "cycloalkyl" used in the present invention refers to a saturated non-aromatic ring system consisting of at least 3 carbon atoms, which can be monocyclic, bicyclic, polycyclic, and can also be fused, bridged, and spiro ring. As non-limiting examples of cycloalkyls, the following groups can be listed: cyclopropyl, cyclobutyl, cyclopentyl, cyclohexyl, cycloheptyl, cyclooctyl, cyclononyl, cyclodecyl; A fused ring, bridged ring or spiro ring group formed by one or more of the above-mentioned monocyclic rings through a common edge and a common carbon atom.

The term "aryl" as used herein, either alone or as part of "arylalkyl", refers to monocyclic, bicyclic and tricyclic carbocyclic ring systems containing a total of 6-14 membered rings, wherein at least one ring systems are aromatic, where each ring system contains a 3-7 membered ring with only one point of attachment to the rest of the molecule. The term "aryl" can be used interchangeably with the term "aromatic ring," e.g., aromatic rings can include phenyl, naphthyl, and anthryl.

The term "heteroaryl" as used in the present invention refers to a 5-14 membered aromatic heterocyclic ring system having one or more heteroatoms independently selected from N, O or S, which can be monocyclic, bicyclic, polycyclic, wherein bicyclic and polycyclic rings can be formed by monocyclic rings through single bond connection or fusion. As non-limiting examples of heteroaryl, the following groups can be listed: oxazolyl, isoxazolyl, imidazolyl, furyl, indolyl, isoindolyl, pyrrolyl, triazolyl, triazinyl, tetrazolyl, thienyl, thiazolyl, isothiazolyl, pyridyl, pyrimidinyl, pyrazinyl, pyridazinyl, benzofuranyl, benzothiazolyl, benzoxazolyl, benzimidazolyl, benzothienyl, benzopyranyl, carbazolyl, quinolyl, isoquinolyl, quinazolinyl, cinnolinyl, nalidixic, pteridinyl, purinyl, quinoxalinyl, thiadiazolyl, indolazinyl, acridinyl, phenazinyl, phthalazinyl, coumarinyl, pyrazolopyridyl, pyridopyridazinyl, pyrrolopyridyl, imidazopyridyl, pyrazolopyridazyl; and groups formed from the aforementioned heteroaryl groups by single bond connection or fusion.

The compound of the present invention can also be used in the form of a pharmaceutically acceptable salt, ester, solvate or isomer thereof (including a stereoisomer, an enantiomer, a tautomer or a mixture thereof). The physiologically acceptable salt of the compound as represented by formula I includes conventional salts formed with pharmaceutically acceptable inorganic acids or organic acids or inorganic bases or organic bases and addition salts of quaternary ammonium acid. More specific examples of suitable acidic salts include hydrochloric acid, hydrobromic acid, sulfuric acid, phosphoric acid, nitric acid, perchloric acid, fumaric acid, acetic acid, propionic acid, succinic acid, glycolic acid, formic acid, lactic acid, maleic acid, tartaric acid, citric acid, pamoic acid, malonic acid, hydroxymaleic acid, phenylacetic acid, glutamic acid, benzoic acid, salicylic acid, fumaric acid, toluenesulfonic acid, methanesulfonic acid, naphthalene-2-sulfonic acid, benzenesulfonic acid, hydroxynaphthoic acid, hydroiodic acid, malic acid, stearic acid, tannic acid, and the like. More specific examples of suitable basic salts include sodium, lithium, potassium, magnesium, aluminum, calcium, zinc, N,N-dibenzylethylenediamine, chloroprocaine, choline, diethanolamine, ethyl diamine, N-methylglucamine and procaine salts.

Another object of the present invention is to provide a preparation method of the amino acid derivative containing the non-steroidal anti-inflammatory drug structure represented by formula I.

The preparation method of the amino acid derivative containing the non-steroidal anti-inflammatory drug structure as represented by formula I provided by the present invention comprises the following steps:

1) Coupling the compound represented by formula 1 with the compound represented by formula 2 (1,1,2,2-4methyl-4-aminopiperidine) to obtain the tert-butoxycarbonyl protected peptide represented by formula 3:

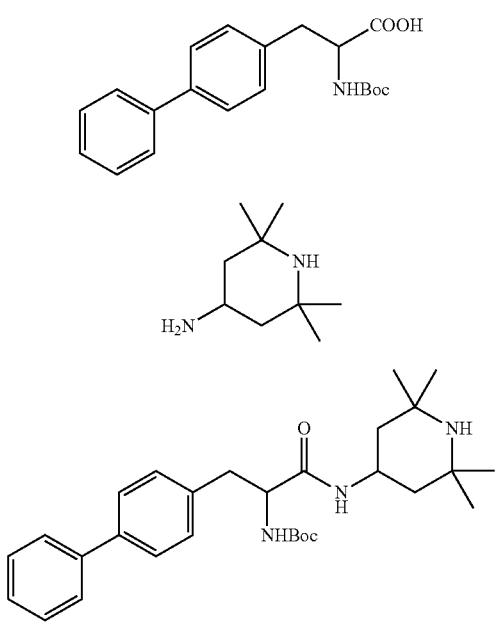

2) removing the tert-butoxycarbonyl protective group from the tert-butoxycarbonyl-protected peptide as represented by formula 3 to obtain a compound as represented by formula 4;

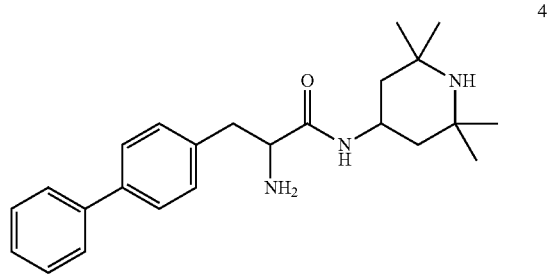 [SMILES: CC1(C)CC(NC(=O)C(N)Cc2ccc(-c3ccccc3)cc2)CC(C)(C)N1]

3) subjecting the compound represented by the formula 4 to a coupling reaction with the compound represented by the formula 5 (non-steroidal anti-inflammatory drug) to obtain the compound represented by the formula I.

wherein, the definition of R in the compound represented by formula 5 is the same as that of formula I.

Another object of the present invention is to provide the use of the amino acid derivatives containing the non-steroidal anti-inflammatory drug structure represented by the aforementioned formula I or pharmaceutically acceptable salts, esters, solvates or isomers thereof (including stereoisomers, enantiomers, tautomers or mixtures thereof).

The use provided by the present invention includes the following aspects: 1) the use of the amino acid derivatives containing the non-steroidal anti-inflammatory drug structure represented by formula I or pharmaceutically acceptable salts, esters, solvates or isomers thereof (including stereoisomers, enantiomers, tautomers or mixtures thereof) in the preparation of a drug for the prevention and/or treatment of a cancer; 2) the use of the amino acid derivatives containing the non-steroidal anti-inflammatory drug structure represented by formula I or the pharmaceutically acceptable salts, esters, solvates or isomers thereof (including stereoisomers, enantiomers, tautomers or mixtures thereof) in the preparation of a drug for inhibiting the proliferation of cancer cells.

The cancer includes various cancers (solid or non-solid cancers) known in the art, including but not limited to liver cancer, lung cancer, breast cancer, pancreatic cancer, colon cancer, cervical cancer, gastric cancer, prostate cancer, melanoma, human osteosarcoma.

The cancer cells include liver cancer cells (such as Bel-7402 cells, HepG-2 cells, SK-hep1 cells), lung cancer cells (such as A549 cells, H460 cells, H1299 cells, H292 cells), breast cancer cells (such as MCF-7 cells), pancreatic cancer cells (such as Bxpc-3 cells), colon cancer cells (such as HT29 cells), cervical cancer cells (such as Hela cells), gastric cancer cells (such as SGC cells), prostate cancer cells (such as PC-3 cells), human osteosarcoma cells (such as MG63 cells).

The drug for preventing and/or treating cancer prepared by using the amino acid derivative containing non-steroidal anti-inflammatory drug structure represented by formula I or pharmaceutically acceptable salts, esters, solvates or isomers thereof (including stereoisomers, enantiomers, tautomers or mixtures thereof) also belongs to the protection scope of the present invention.

The drug for preventing and/or treating cancer can be introduced into the body such as muscle, intradermal, subcutaneous, intravenous, mucosal tissue by injection, spray, nasal instillation, eye instillation, penetration, absorption, physical or chemical mediation; or introduced into the body after being mixed or wrapped by other substances.

When necessary, one or more pharmaceutically acceptable carriers can also be added to the above-mentioned drug. The carrier includes conventional diluents, excipients, fillers, binders, wetting agents, disintegrants, absorption promoting agents, surfactants, adsorptive carriers, lubricants and the like in the pharmaceutical field.

The aforementioned drug can be formulated as various forms such as injections, freeze-dried injections, tablets (including enteric-coated tablets), capsules, powders, oral liquids and granules. The drugs in the aforementioned various dosage forms can be prepared by conventional methods in the pharmaceutical field.

The present invention also provides a pharmaceutical composition. The pharmaceutical composition comprises an effective dose of any of the aforementioned amino acid derivatives containing a non-steroidal anti-inflammatory drug structure or a pharmaceutically acceptable salt, ester, solvate or isomer thereof (including stereoisomer, enantiomers, tautomers or mixtures thereof).

The novel compound of the present invention can be prepared by an artificial synthesis method, the novel compound has a broad-spectrum anti-tumor effect, can prolong the survival period of tumor patients and improve the life quality of tumor patients. The compound has stable efficacy, low toxicity, is easily accepted by the human body, can be applied to the treatment of most cancers, and has certain advantages over currently marketed antitumor drugs.

The preferred dosage range of the bulk drug in the present invention is 0.01-50 mg.

Commonly used excipients for preparing the oral solid preparations of the present invention include microcrystalline cellulose, low-substituted-hydroxypropyl cellulose, polyvinylpyrrolidone, micropowder silica gel, starch, dextrin, sucrose, lactose, talc, magnesium stearate, sodium carboxymethyl starch, cross-linked polyvinylpyrrolidone, pregelatinized starch and the like.

The excipients for preparing the oral liquid preparations of the present invention include: ethanol, ethylparaben, methylparaben, polysorbate-80, sodium benzoate, sorbic acid, honey, sucrose, sodium bisulfite, sodium thiosulfate, ascorbic acid, thiourea, EDTA-2Na, phosphoric acid, citric acid, glycerol, lactose and the like.

The aforementioned raw material components can be matched with a certain proportion of commonly used pharmaceutical excipients, and can be made into any one of injections, granules, capsules and the like according to conventional methods in the art.

The compound of formula I provided by the present invention is a completely new compound designed from de novo design approach. The compounds in the present invention are a class of bradykinin receptor antagonists, which can inhibit the growth and invasion of tumor cells by inhibiting the bond of bradykinin with its receptor, and further inhibit the oncogenesis of tumors.

Compounds with similar structures may have the same mechanism of action. Understanding the mechanism of action of different compounds will help to have a full understanding of the clinical application prospects and possible problems of the compounds herein and their analogs, and make research and development more targeted.

THE BEST WAY TO IMPLEMENT THE INVENTION

Figure 1:
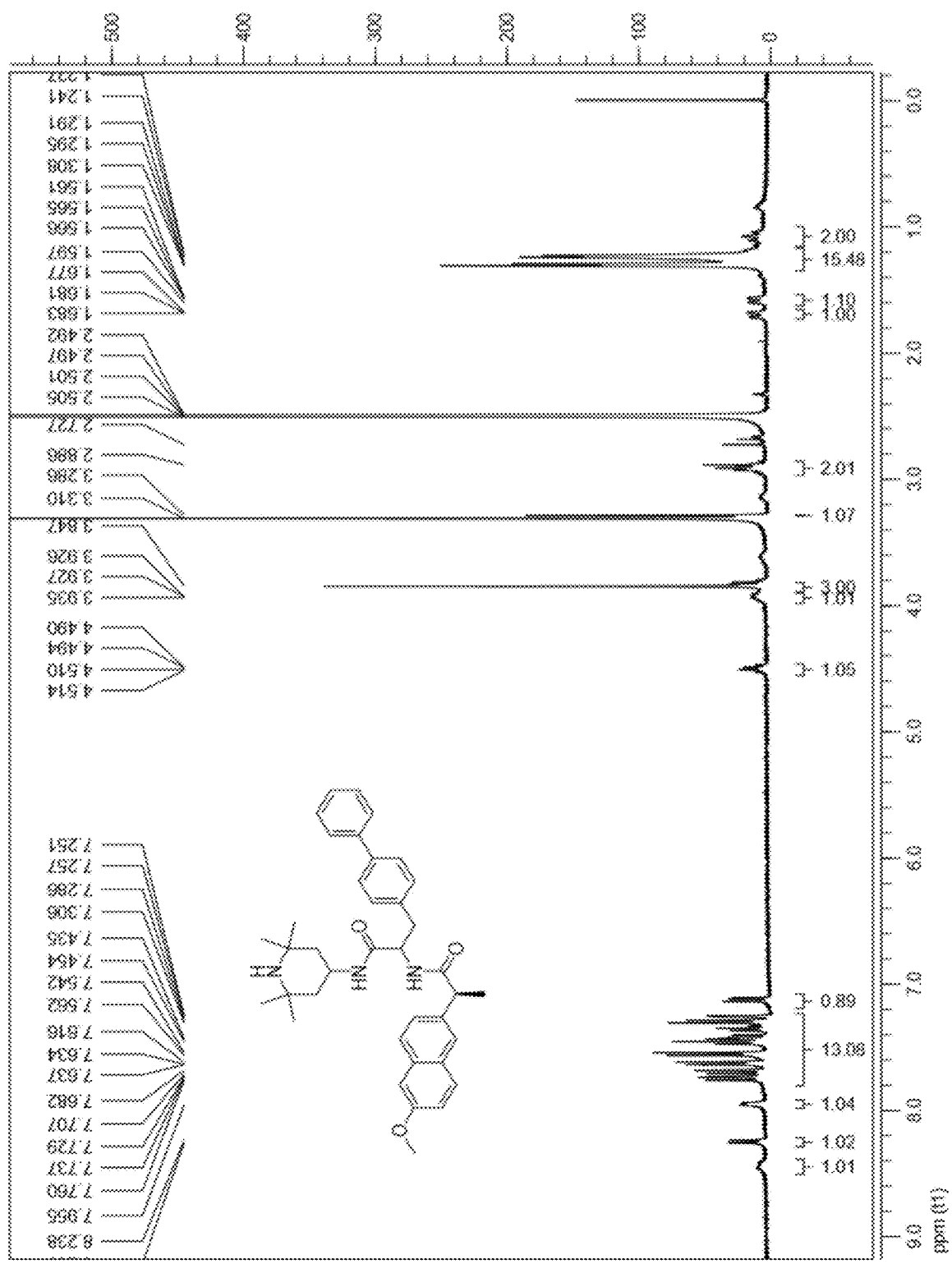
FIG. 1 is the structural confirmation spectrum of PL-AC-202.
Figure 2:
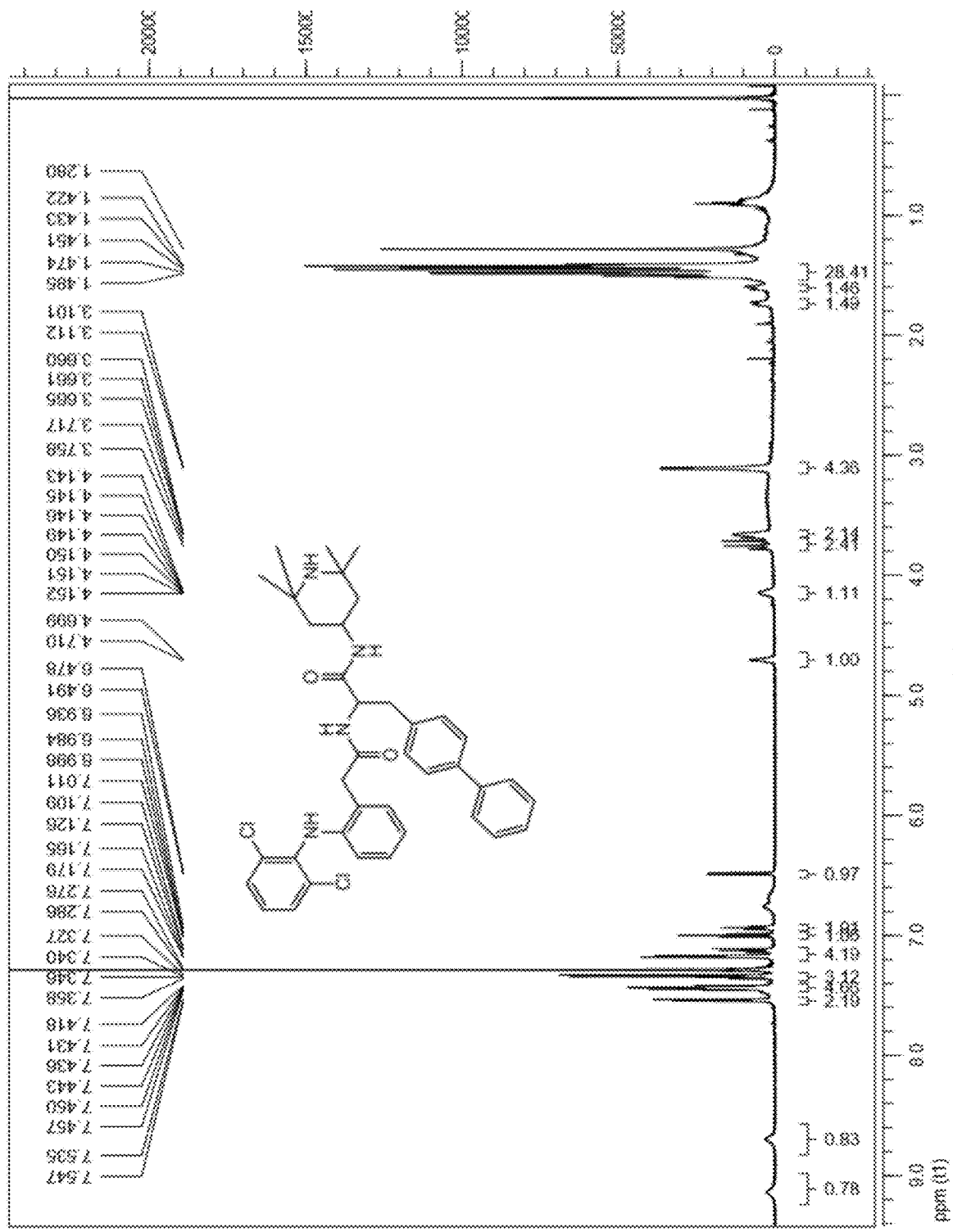
FIG. 2 is the structural confirmation spectrum of PL-AC-203.
Figure 3:
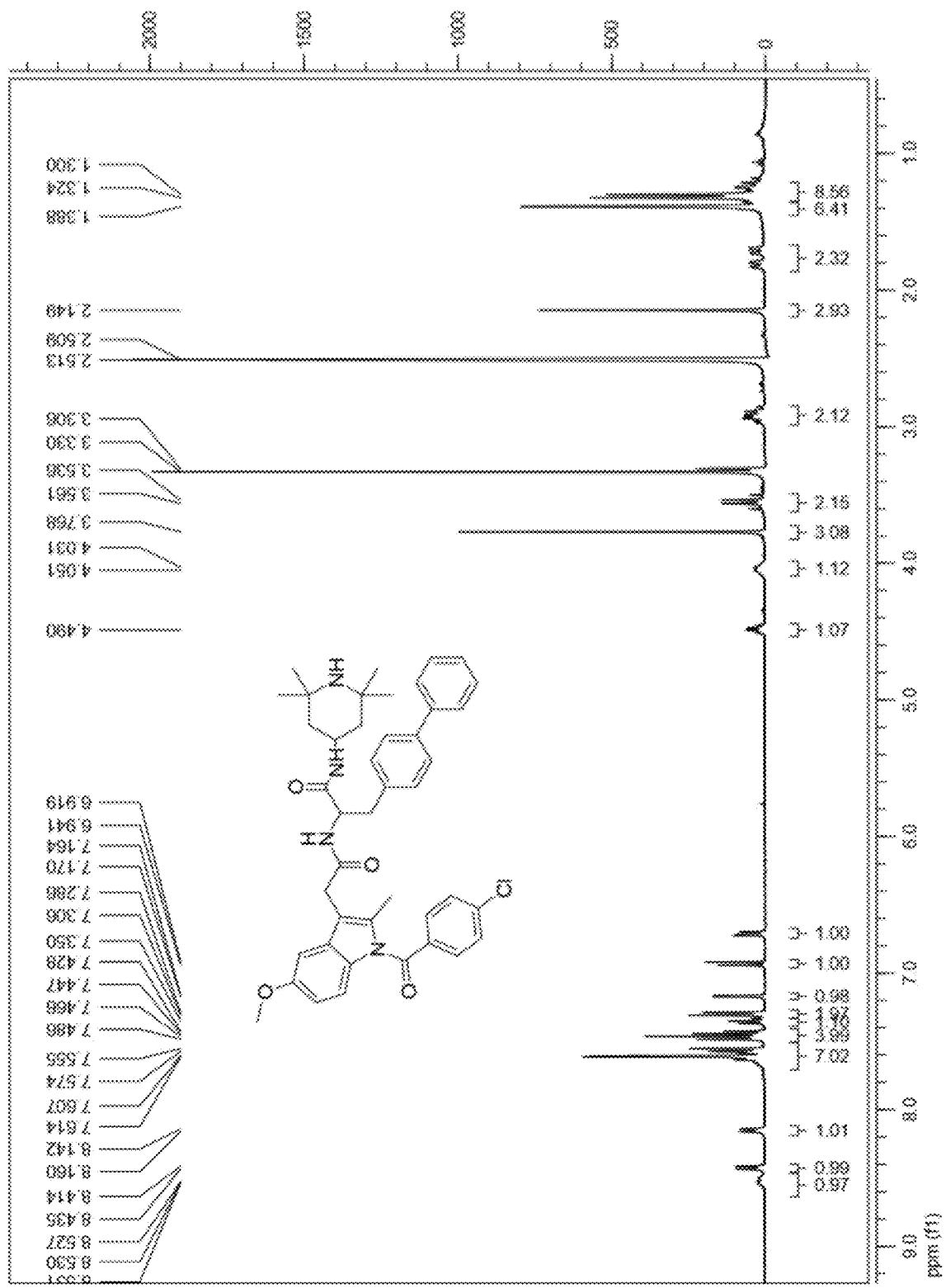
FIG. 3 is the structural confirmation spectrum of PL-AC-205.
Figure 4:
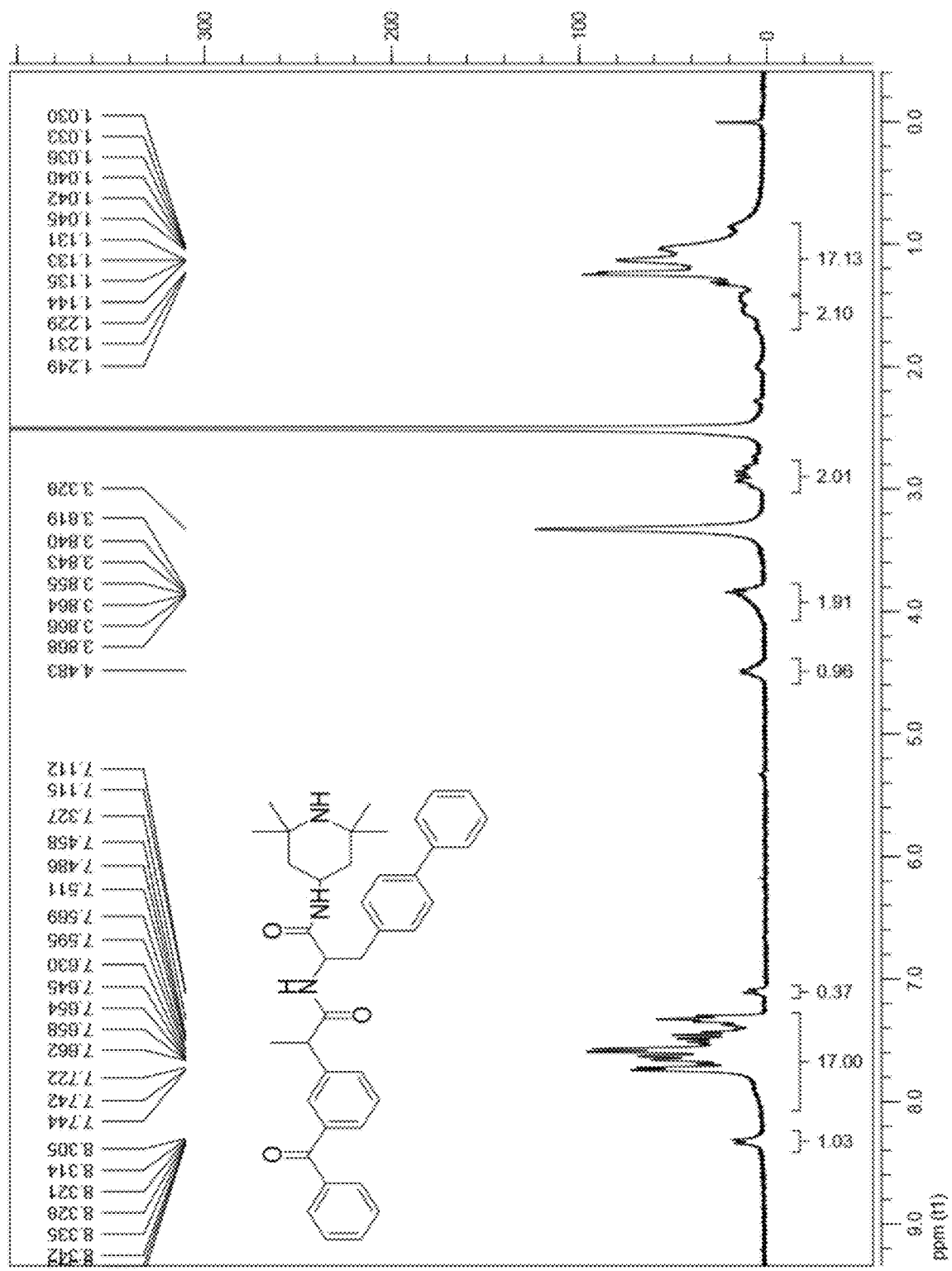
FIG. 4 is the structural confirmation spectrum of PL-AC-206.

The present invention will be described below through specific embodiments, but the present invention is not limited thereto, and any modifications, equivalent replacements and improvements made within the spirit and principles of the present invention should be included in the protection scope of the present invention.

The experimental methods used in the following examples are conventional methods unless otherwise specified.

The materials, reagents, etc. used in the following examples can be obtained from commercial sources unless otherwise specified.

The structural formula of the compound PL-AC-15 involved in the following examples is represented as below:

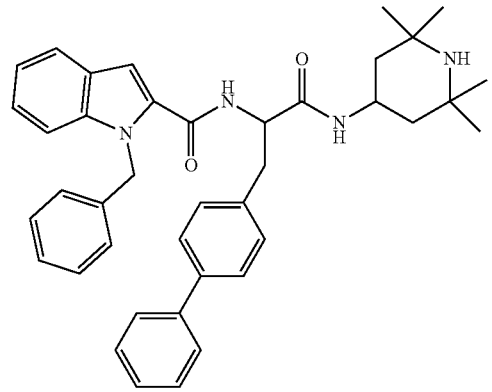 [SMILES: CC1(C)CC(NC(=O)C(Cc2ccc(-c3ccccc3)cc2)NC(=O)c2cc3ccccc3n2Cc2ccccc2)CC(C)(C)N1]

The details of its preparation can be found in Chinese Patent CN107382827A.

1. Preparation of Compounds

Example 1. Preparation of Compound PL-AC-202

The structural formula of PL-AC-202 is represented as below:

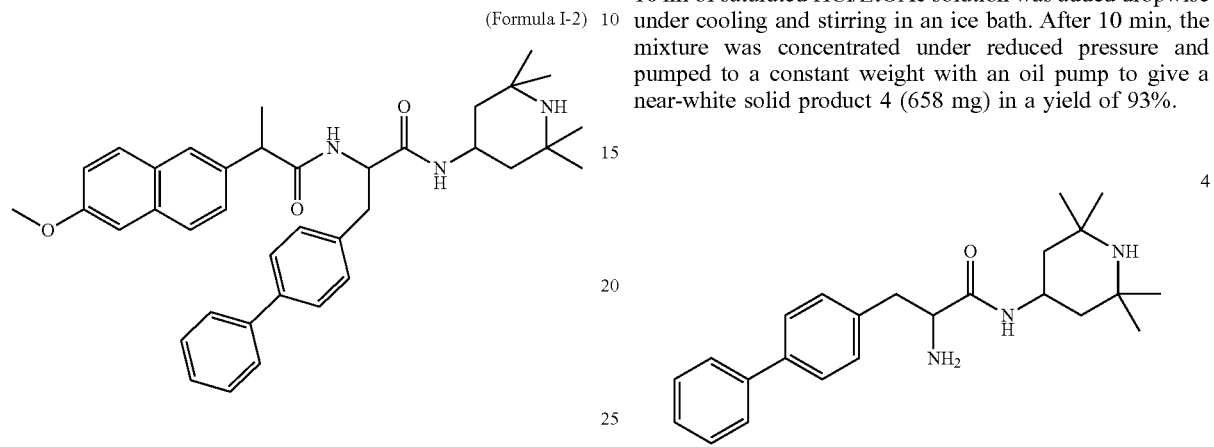

(Formula I-2)

The preparation method is as follows:

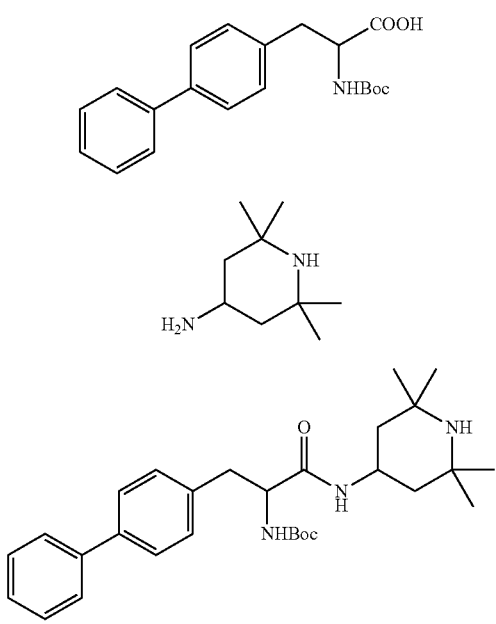

1) Compound 1 (1.0 g, 2.93 mmol), compound 2 (458 mg, 2.93 mmol), BOP (1.42 mg, 3.22 mmol) and DIPEA (1.02 ml, 5.86 mmol) were sequentially added to dry acetonitrile (50 ml). The reaction solution was stirred overnight at room temperature, and a large amount of white solid was precipitated. Concentrated under reduced pressure with a rotary evaporator. 50 ml of water and 50 ml of ethyl acetate were added into the residual solid, and the organic layer was separated. The aqueous layer was extracted with ethyl acetate (50 ml×2) twice, combined and washed with saturated NaHCO$_3$ solution (30 ml×3) and brine (30 ml×3) successively, followed by drying over anhydrous magnesium sulfate, separated and purified by silica gel column chromatography and eluted with dichloromethane/methanol (20:1, v/v) to give product 3 (1.25 g) as a white solid in a 94% yield.

2) Compound 3 (749 mg, 1.56 mmol) was added to 25% TFA/DCM (50 ml), and the reaction was stirred at room temperature for 30 min till the reaction was completed. Concentrated under reduced pressure, and the residual syrup was dissolved in an appropriate amount of methanol. About 10 ml of saturated HCl/EtOAc solution was added dropwise under cooling and stirring in an ice bath. After 10 min, the mixture was concentrated under reduced pressure and pumped to a constant weight with an oil pump to give a near-white solid product 4 (658 mg) in a yield of 93%.

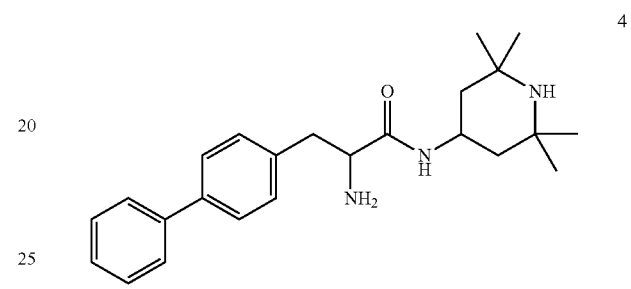

3) Compound 4 (91 mg, 0.2 mmol), naproxen (0.22 mmol), HATU (114 mg, 0.3 mmol) and DIPEA (0.13 mL, 0.8 mmol) were sequentially added to dry DMF or dichloromethane (3 ml). The reaction solution was stirred at room temperature for 24 hours. 15 ml of water was then added, extracted with dichloromethane (20 ml×3) three times. The organic layers were combined, washed with saturated NaHCO$_3$ and brine (10 ml×3), followed by drying over anhydrous sodium sulfate, separated and purified by silica gel column chromatography and eluted with dichloromethane/methanol to give the target product.

$^1$H-NMR (DMSO-d$_6$, d: 1.05-1.15 (m, 2H, CH$_2$), 1.23-1.31 (s, 15H, CH$_3$), 1.56-1.57 (m, 1H, CH$_2$), 1.67-1.68 (m, 1H, CH$_2$), 2.83-2.89 (m, 2H, CH$_2$), 3.83 (q, 1H, CH), 3.29 (s, 1H), 3.8 (s, 3H, OCH$_3$), 3.92-3.94 (m, 1H, CH), 4.49-4.51 (m, 1H, CH), 7.25-7.76 (m, 15H, NH, ArH), 7.96 (d, 1H, ArH), 8.24 (d, 1H, ArH), 8.44 (m, 1H, NH). MS m/z: 592.25 (MH$^+$).

The NMR spectrum was shown in FIG. 1.

Other compounds of formula I (e.g., compound formula I-1, formula I-3, formula I-4, formula I-5, formula I-6) can be prepared according to the above-mentioned methods, and only need to replace naproxen in step 3 into the corresponding non-steroidal anti-inflammatory drugs.

2. Drug Efficacy Test

Example 2. In Vitro Antitumor Activity Test of the Compound Represented by Formula I 13 human tumor cell lines were selected and cultured in RPMI-1640 medium (Gibco company) containing 10% inactivated fetal bovine serum, 100 U/ml penicillin and 100 U/ml streptomycin, cultured at 37° C. in a 5% CO$_2$ incubator, and passaged once every 2 days. Using the MTT method, cells in the logarithmic growth phase were digested with 0.25% trypsin, centrifuged at 1000 r/min for 5 min, 8×10$^3$ cells were added to each well, and seeded in a 96-well plate, and 180 μl of cell suspension was added to each well, and a blank was set at the same time. The 96-well plate inoculated with tumor cells was placed in a carbon dioxide incubator for 24 hours, and then 20 μl of the drug was added, and an equal volume of culture medium was added to the blank control well, and the drug was divided into 8 concentrations from 50 μg/L to 0.4 μg/L. Three duplicate wells were set for each drug concentration and placed in an incubator for 24 h. 10 μl of MTT solution (5 mg/ml) was added to each well, and the culture was continued for 4 h. The supernatant was aspirated and discarded, 100 μl of dimethyl sulfoxide (DMSO) solution was added to each well, placed on a micro shaker for 10 min, and the absorbance (A value) was measured at a wavelength of 492 nm in a microplate reader, and the inhibition rate of the drug on tumor cells was calculated according to the following formula.

In this test, the $IC_{50}$ value of the compound on tumor cells was calculated by the Origin software according to the inhibition rate of the compound. The results were shown in Table 1. AC-201 in the following table was the abbreviation of PL-AC-201, and so on.

TABLE 1

In vitro antitumor activity test $IC_{50}$ results of the compounds of the examples (nM)

| Tumor cells | AC-201 | AC-202 | AC-203 | AC-204 | AC-205 | AC-206 | AC-15 |
|---|---|---|---|---|---|---|---|
| Liver cancer Bel-7402 | 50.23 | 45.6 | 45.4 | 40.73 | <38.25 | <38.25 | 81.65 |
| Liver cancer HepG-2 | 16.11 | 15.81 | 16.04 | 15.93 | 16.17 | 16.07 | 16.2 |
| Liver cancer SK-hep1 | 16.22 | 11.47 | 22.58 | 23.62 | 12.41 | 15.74 | 26.37 |
| Lung cancer A549 | 29.94 | 23.16 | 24.18 | 29.79 | 24.53 | 27.47 | 31.21 |
| Lung cancer H460 | 21.88 | 18.46 | 20.84 | 21.61 | 20.27 | 20.03 | 21.96 |
| Lung cancer H1299 | 23.72 | 19.83 | 20.48 | 21.56 | 20.33 | 20.19 | 24.44 |
| Lung cancer H292 | 22.28 | 20.14 | 24.93 | 27.61 | 27.39 | 24.1 | 28.29 |
| Breast cancer MCF-7 | 24.26 | 21.05 | 23.1 | 23.08 | 23.17 | 22.46 | 23.17 |
| Pancreatic cancer Bxpc-3 | 52.11 | 35.08 | 49.38 | 49.38 | 45.31 | 37.72 | 48.91 |
| Colon cancer HT29 | 35.88 | 32.54 | 36.97 | 37.42 | 36.97 | 37.42 | 38.19 |
| Cervical cancer Hela | 19.53 | 16.08 | 20.03 | 19.16 | 19.49 | 19.2 | 19.74 |
| Melanoma B16 | 29.79 | 28.39 | 30.08 | 30.51 | 31.72 | 30.06 | 30.49 |
| Human osteosarcoma MG63 | 24.82 | 24.12 | 26.01 | 24.51 | 25.7 | 24.92 | 25.78 |

Example 3. Experimental Report on the Detection of Hemolytic Activity of the Compounds of the Examples 2-3 ml of human blood was drawn using an anticoagulant tube, thoroughly mixed, and kept at 4° C. for later use. 2 ml of blood was aspirated and added with 2-3 ml of PBS, followed by gently pipetting and centrifugation for 5 min at 1000 rpm, which was repeated 3-4 times. After the last centrifugation, PBS was aspirated, PBS was added to 40 ml (20 times the volume), and the number of blood cells at this time was $2\times10^8$ cells/ml. The red blood cell suspension was added to the plate (U-shaped 96-well plate), and 70 μl/well was used as a negative well. Only PBS was added to blank wells, 140 μl/well. 2 ml of the red blood cell suspension was centrifuged, PBS was discarded, 2 ml of pure water was added, mixed well, and 140 μl/well was used as a positive well. The diluted polypeptide solutions of different concentrations were added to the plate, 70 μl/well. Incubated at 37° C., 87 rpm, shaken for 2h, centrifuged for 5 min at 3000 rpm. The OD value measured by microplate reader: After centrifugation, 90 μl of supernatant was drawn and transferred to a flat-bottom 96-well plate, and the OD value at 578 nm was measured by microplate reader. ODtest-OD negative >0.1 (the first concentration that met the conditions was MHC). The results were shown in Table 2.

TABLE 2

The experimental results of the hemolytic activity detection of the compounds of the examples

| Compound | MHC (μg/ml) |
|---|---|
| PL-AC-201 | 3000 |
| PL-AC-202 | 3000 |

TABLE 2-continued

The experimental results of the hemolytic activity detection of the compounds of the examples

| Compound | MHC (μg/ml) |
|---|---|
| PL-AC-203 | 2000 |
| PL-AC-204 | 3000 |
| PL-AC-205 | 3000 |
| PL-AC-206 | 3000 |
| PL-AC-15 | 1000 |

Example 4, the Therapeutic Index of Compound as Represented by Formula I

The ratio of the hemolytic concentration MHC of the compound to the mean $IC_{50}$ for each tumor was referred to as the therapeutic index (TI). The safety of the compound was evaluated by the therapeutic index. The higher the therapeutic index, the greater the safety range of the compound. The current results showed that compared with PL-AC-15, the therapeutic index of PL-AC-201 to 206 series compounds increased by 2-4 times, indicating better safety, and the therapeutic index results of each compound were shown in Table 3.

TABLE 3

Therapeutic index comparisons of the compounds of the examples

| Compound | Average$IC_{50}$ (nM) | MHC (nM) | TI | TI (fold conversion) |
| --- | --- | --- | --- | --- |
| PL-AC-15  | 32.03 | $1.6 \times 10^6$ | 50983.88  | 1 |
| PL-AC-201 | 28.21 | $5.8 \times 10^6$ | 206758.2  | 4 |
| PL-AC-202 | 23.98 | $5.1 \times 10^6$ | 211563.8  | 4 |
| PL-AC-203 | 27.69 | $3.0 \times 10^6$ | 110043.4  | 2 |
| PL-AC-204 | 28.07 | $4.1 \times 10^6$ | 145732.3  | 3 |
| PL-AC-205 | 25.29 | $4.2 \times 10^6$ | 165149.4  | 3 |
| PL-AC-206 | 24.62 | $4.9 \times 10^6$ | 198061.1  | 4 |

Example 5. Acute Toxicity Test of Single Administration of Compound as Represented by Formula I to ICR Mice ICR mice, 18-22 g, were raised in a common-grade animal room, fed with common feed, and ingested freely. The group distance and dose were determined after exploring the Dm and Dn of the compounds of the examples. Five concentrations of the compounds of the examples were formulated at the desired dose. The corresponding doses of drugs were injected into the tail vein according to body weight, and the blank control group was injected with normal saline. Immediately after administration, the performance and death of each animal were observed and recorded, and the possible toxic reaction or death of animals within 7 days after a single administration was observed and recorded. The results were shown in Table 4.

TABLE 4

Acute toxicity test results of single administration of the compounds of the examples to ICR mice

| Group | Number of animals (numbers) | $LD_{50}$ (mg/kg) |
| --- | --- | --- |
| PL-AC-15  | 10 | 23.64 |
| PL-AC-201 | 10 | 27.21 |
| PL-AC-202 | 10 | 34.79 |
| PL-AC-203 | 10 | 39.81 |
| PL-AC-204 | 10 | 29.95 |
| PL-AC-205 | 10 | 35.64 |
| PL-AC-206 | 10 | 31.73 |

Example 6. Inhibitory Effect of Intraperitoneal Injection on Transplanted Tumor in Nude Mice BALB/c nude mice were used to inoculate Bel-7402, HepG-2 and SK-hep1 liver tumors according to the transplanted tumor research method under aseptic operation, and the cell density was not less than $5 \times 10^6$/ml, 0.2 ml was inoculated subcutaneously in the axilla of the right hind limb of each mouse. After the cells were inoculated, the cells were administered intraperitoneally (concentration: 5 mg/kg), once every 3 days, for a total of 8 administrations. After the 2nd day of drug withdrawal, all tumor-bearing mice were sacrificed, and their body weight, tumor weight and tumor inhibition were weighed. See Table 5.

TABLE 5

Effects of intraperitoneal administration of the compounds of the examples on body weight and tumor weight of BALB/c tumor-bearing mice

| | | | Body Weight (g) | | | Tumor |
| --- | --- | --- | --- | --- | --- | --- |
| | Group | Dose(mg/kg) | Before administration | After administration | Tumor weight (mg) | inhibition rate (%) |
| Liver cancer Bel-7402 | Model group | — | 19.2 ± 1.3 | 23.3 ± 0.7 | 793.0 ± 0.6 | — |
| | PL-AC-15  | 5 | 19.3 ± 0.9 | 25.2 ± 1.1 | 302.9 ± 0.8 | 61.8** |
| | PL-AC-201 | 5 | 18.9 ± 0.7 | 23.2 ± 1.0 | 268.1 ± 9.6 | ▲▲66.2** |
| | PL-AC-202 | 5 | 19.4 ± 0.7 | 22.9 ± 1.1 | 213.3 ± 9.3 | ▲▲73.1** |
| | PL-AC-203 | 5 | 19.1 ± 1.9 | 24.1 ± 0.9 | 327.4 ± 10.4 | 58.7** |
| | PL-AC-205 | 5 | 19.1 ± 0.9 | 23.9 ± 0.6 | 242.8 ± 6.6 | ▲▲69.4** |
| | PL-AC-206 | 5 | 19.2 ± 0.9 | 23.8 ± 1.3 | 226.8 ± 9.1 | ▲▲71.4** |
| Liver cancer HepG-2 | Model group | — | 19.8 ± 1.0 | 23.8 ± 0.9 | 1651.3 ± 11.2 | — |
| | PL-AC-15  | 5 | 19.5 ± 0.7 | 23.8 ± 1.0 | 549.9 ± 10.2 | 66.7** |
| | PL-AC-201 | 5 | 18.7 ± 0.3 | 22.9 ± 1.4 | 506.9 ± 9.4 | 69.3** |
| | PL-AC-202 | 5 | 19.0 ± 1.0 | 22.8 ± 0.8 | 406.2 ± 5.9 | ▲▲75.4** |
| | PL-AC-203 | 5 | 19.2 ± 0.6 | 22.7 ± 1.7 | 455.8 ± 9.9 | ▲▲72.4** |
| | PL-AC-204 | 5 | 19.0 ± 0.8 | 23.1 ± 1.0 | 576.3 ± 10.7 | 65.1** |
| | PL-AC-205 | 5 | 18.9 ± 0.5 | 21.9 ± 1.2 | 465.6 ± 5.9 | ▲71.8** |
| | PL-AC-206 | 5 | 19.6 ± 1.0 | 23.5 ± 1.1 | 468.9 ± 2.2 | ▲▲74.6** |
| Liver cancer SK-hep1 | Model group | — | 19.2 ± 1.3 | 25.3 ± 0.6 | 1120.5 ± 2.1 | — |
| | PL-AC-15  | 5 | 18.9 ± 0.7 | 23.2 ± 0.3 | 441.5 ± 10.8 | 60.6** |
| | PL-AC-201 | 5 | 19.1 ± 1.4 | 23.7 ± 1.1 | 434.7 ± 9.4 | 61.2** |
| | PL-AC-202 | 5 | 19.2 ± 0.9 | 24.9 ± 1.0 | 317.1 ± 8.7 | ▲▲71.7** |
| | PL-AC-203 | 5 | 19.2 ± 0.8 | 24.7 ± 0.5 | 355.2 ± 1.2 | ▲▲68.3** |

TABLE 5-continued

Effects of intraperitoneal administration of the compounds of the examples on body weight and tumor weight of BALB/c tumor-bearing mice

| Group | Dose(mg/kg) | Body Weight (g) Before administration | Body Weight (g) After administration | Tumor weight (mg) | Tumor inhibition rate (%) |
|---|---|---|---|---|---|
| PL-AC-205 | 5 | 19.0 ± 1.7 | 22.2 ± 0.9 | 425.8 ± 10.7 | 62.0** |
| PL-AC-206 | 5 | 19.2 ± 0.9 | 23.0 ± 1.5 | 337.3 ± 6.1 | ▲▲69.9** |

*$P < 0.05$,
**$P < 0.01$ compared with the model group;
▲$P < 0.05$,
▲▲$P < 0.01$ compared witht the PL-AC-15 group.

3. Formulation Example 7, the Prescription and Process of Capsule (10 mg/Capsule)

TABLE 6

Prescription of Capsules

| Raw/excipients | Amount |
|---|---|
| PL-AC-202 | 10 g |
| Pregelatinized starch | 100 g |
| Dextrin | 100 g |
| Mannitol | 80 g |
| Sodium carboxymethyl cellulose | Moderate |
| Water | Moderate |
| Talc | 7 g |
| Magnesium stearate | 3 g |
| Production | 1000 capsules |

The raw excipients were passed through a 100-mesh sieve respectively. 100 g of pregelatinized starch, 100 g of dextrin, 80 g of mannitol, 7 g of talc and 4 g of magnesium stearate were mixed uniformly, and mixed with PL-AC-202 by equal increment method until uniform. A suitable soft material was prepared with a 1% solution of sodium carboxymethyl cellulose as a binder. Granulation was carried out with 16-24 mesh nylon mesh, and the granules were dried at 55-60° C. The dry granules were sized with a 10-mesh sieve and filled into capsules. Example 8, the prescription and process of oral liquid (10 mg/piece)

TABLE 7

Prescription of oral liquid

| Raw/excipients | Amount |
|---|---|
| PL-AC-206 | 10 g |
| Sucrose | 2000 g |
| Ethylparaben | 100 g |
| Water for injection | 10000 g |
| Production | 1000 bottles |

Measured out 50% percent of the prescription of water for injection, and then added sucrose to dissolve. 20% percent of the prescription of water for injection was used to dissolve PL-AC-206 compound and mixed with sucrose aqueous solution. 10% percent of the prescription of water for injection was heated to 60° C., and added ethylparaben to dissolve and stirred evenly. Finally, the above solutions were mixed well. The obtained solution was aseptic filtrated by 0.2 µm microporous membrane, and filled after passing the inspection to obtain the finished product.

Example 9 Prescription and Process of Granules (100 mg/Bag)

TABLE 8

Prescription of granules

| Raw/excipients | Amount |
|---|---|
| PL-AC-202 | 10 g |
| Pregelatinized starch | 135 g |
| Lactose | 120 g |
| Dextrin | 120 g |
| Mannitol | 100 g |
| Polyvinylpyrrolidone | Moderate |
| Water | Moderate |
| Talc | 10 g |
| Magnesium stearate | 5 g |
| Production | 100 bags |

The raw excipients were passed through a 100-mesh sieve respectively. 135 g of pregelatinized starch, 120 g of lactose, 120 g of dextrin, 100 g of Mannitol, 10 g of talc and 5 g of magnesium stearate were mixed uniformly, and mixed with PL-AC-202 by an equal increment method until the mixture was uniform. A suitable soft material was prepared with a 5% solution of polyvinylpyrrolidone as a binder. Granulation was carried out with 14 mesh nylon mesh, and the granules were dried at 55-60° C. The dry granules were sized with a 14-mesh sieve, and then sieved through a 65-mesh sieve to remove the fine powder, divided into doses, and packaged.

The above descriptions are only preferred embodiments of the present invention, and are not intended to limit the present invention. For those skilled in the art, the present invention may have various modifications and changes. Any modification, equivalent replacement, improvement, etc. made within the spirit and principle of the present invention shall be included within the protection scope of the present invention.

INDUSTRIAL APPLICATION

The novel compound of the present invention can be prepared by an artificial synthesis method. The novel compound has a broad-spectrum anti-tumor effect, can prolong the survival period of tumor patients and improve the life quality of tumor patients. The compound has stable efficacy, low toxicity, is easily accepted by the human body, can be applied to the treatment of most cancers, and has certain advantages over currently marketed antitumor drugs.

The invention claimed is:

1. A compound of Formula I or a pharmaceutically acceptable salt, ester, or solvate thereof

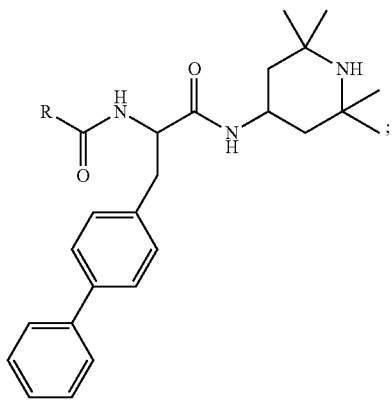
(Formula I)

wherein,
R is Formula b,

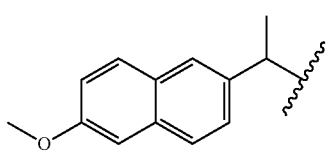
(Formula b)

optionally substituted by one or more R1,
wherein R1 is independently selected from any one of the following groups: halogen, C1-8alkyl, C2-8alkenyl, C2-8alkynyl, C3-12cycloalkyl, C6-12aryl, 3-12-membered heteroalicyclic, 5-12-membered heteroaryl, —CN, —C(=O)R2, —C(=O)OR2, —C(=O)NR3R4, —NO2, —NR3R4, —NR5C(=O)R2, —NR5C(=O)OR6, —NR5C(=O)NR3R4, —NR5S(=O)2R6, —NR5S(=O)2R3R4, —OR2, —OCN, —OC(=O)R2, —OC(=O)NR3R4, —OC(=O)OR2, —OC(=O)NR3R4, —S(=O)mR2, —S(=O)2NR3R4, R1 groups on adjacent atoms can combine to form C3-12 cycloalkyl, C6-12 aryl, 3-12 membered heteroalicyclic and 5-12 membered aromatic heterocycle, and the hydrogen on R1 can be optionally substituted by R7;
wherein R2, R3, R4, R5, and R6 are independently selected from any of the following groups: H, halogen, C1-8 alkyl, C2-8 alkenyl, C2-8 alkynyl, C3-12 cycloalkyl, C6-12 aryl, 3-12-membered heteroalicyclic, 5-12-membered heteroaryl, or any two of R2, R3, R4, R5 and R6 bound to the same nitrogen atom can combine with the nitrogen to which they are bound to form a 3-12 membered heteroalicyclic or 5-12 membered heteroaryl, which optionally contain 1 to 3 heteroatoms selected from N, O and S in addition to the bound nitrogen; or any combination of R2, R3, R4, R5 and R6 bound to the same carbon atom to form a C3-12 cycloalkyl, C6-12 aryl, 3-12 membered heteroalicyclic or 5-12 membered heteroaryl and each hydrogen in R2, R3, R4, R5 and R6 is optionally substituted by R8, or two hydrogen atoms on the same carbon atom in R2, R3, R4, R5 and R6 are optionally oxo substituents;

wherein R7 is independently selected from halogen, C1-8 alkyl, C2-8 alkenyl, C2-8 alkynyl, C3-12 cycloalkyl, C6-12 aryl, 3-12 membered heteroalicyclic, 5-12-membered heteroaryl, —CN, —C(=O)R10, —C(=O)OR10, —C(=O)NR11R12, —NO2, —NR11R12, —NR13C(=O)R10, —NR13C(=O)OR14, —NR13C(=O)NR11R12, —NR13S(=O)2R14, —NR13S(=O)2NR11R12, —OR10, =O, —OC(=O)R10, —OC(=O)NR11R12-, —S(O)mR10, and —S(=O)2NR11R12, and wherein the hydrogen on R7 is optionally substituted by R9;
wherein R10, R11, R12, R13, and R14 are independently selected from any of the following groups, H, C1-8 alkyl, C2-8 alkenyl, C2-8 alkynyl, C3-12 cycloalkyl, C6-12-aryl, 3-12-membered heteroalicyclic, 5-12-membered heteroaryl, and each hydrogen in R10, R11, R12, R13, R14 is optionally substituted with the following groups: halogen, —OH, —CN, —C1-5 alkyl which can be partially or fully halogenated;
wherein R8 and R9 are independently selected from any of the following groups: halogen, C1-8alkyl, C2-8alkenyl, C2-8alkynyl, C3-12cycloalkyl, C6-12aryl, 3-12-membered heteroalicyclic, 5-12-membered heteroaryl, —CN, —C(=O)(CH2)nCH3, —C(=O)O(CH2)nCH3, —C(=O)N[(CH2)nCH3]2, —C(=O)OH, —C(=O)NH2, —C(=O)NH(CH2)nCH3, —NO2, —NH2, —NH(CH2)nCH3, —N[(CH2)nCH3]2, —NHC(=O)(CH2)nCH3, —NHS(=O)2(CH2)nCH3, —OH, —OC(CH2)nCH3, =O, —OC(=O)(CH2)nCH3, —S(=O)(CH2)nCH3, —OS(=O)(CH2)nCH3, and —S(=O)2N[(CH2)nCH3]2;
wherein m has a value selected from 0, 1, and 2; and wherein n has a value selected from 0, 1, 2, 3, 4, or 5.

2. The compound of claim 1, wherein the compound of Formula I is a compound of Formula I-2

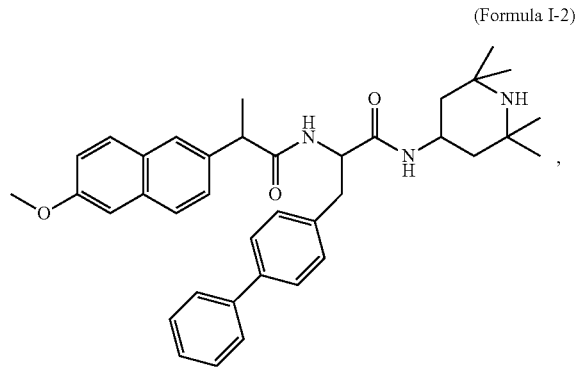
(Formula I-2)

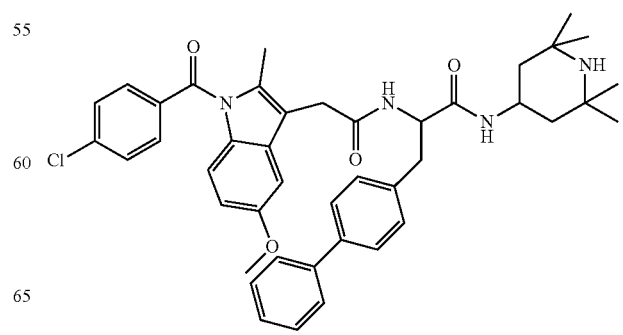
(Formula I-5)

(Formula I-6)

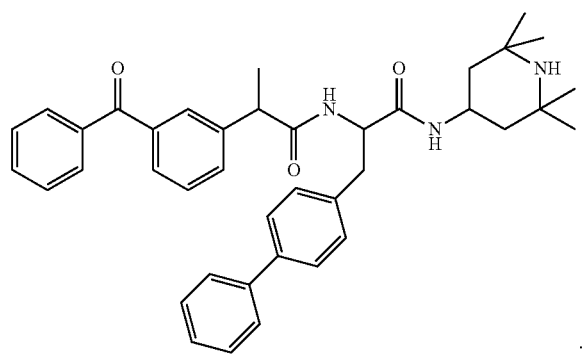

or a pharmaceutically acceptable salt, ester, or solvate thereof.

3. A pharmaceutical composition comprising a compound of claim 1 or a pharmaceutically acceptable salt, ester, or solvate thereof.

4. A dosage form of the pharmaceutical composition of claim 3, wherein the dosage form comprises capsules, powders, oral liquids, granules, and tablets.

5. A method for preparing a compound of Formula I of claim 1, or a pharmaceutically acceptable salt, ester, or solvate thereof.

6. The method of preparing a compound of claim 5 comprising the following steps:

1) coupling the compound represented by Formula 1 with the compound represented by Formula 2 to obtain a tert-butoxycarbonyl protected peptide represented by Formula 3:

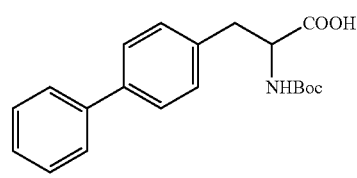

1

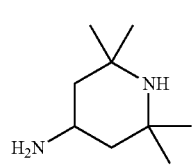

2

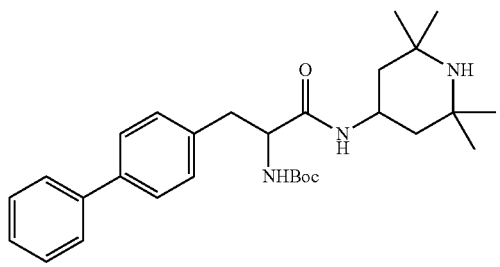

3

2) removing the tert-butoxycarbonyl protecting group from the tert-butoxycarbonyl-protected peptide as represented by Formula 3 to obtain a compound as represented by Formula 4:

4

3) subjecting the compound represented by the Formula 4 to a coupling reaction with the compound represented by the Formula 5 to obtain the compound represented by the Formula 1;

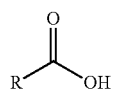

5 wherein, the R in the compound of Formula 5 is represented by the following Formula b:

(Formula b)

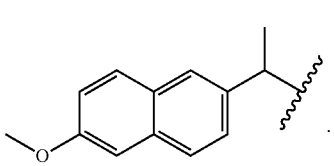

7. The method of claim 5, wherein the compound of Formula I is Formula I-2

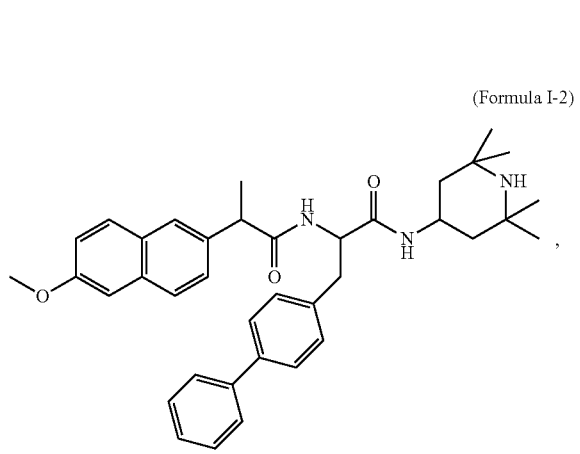

(Formula I-2)

(Formula I-5)

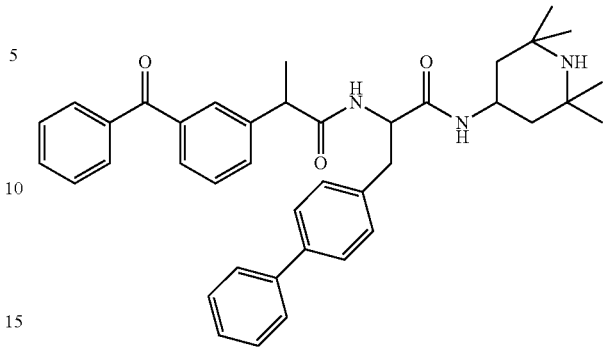

(Formula I-6)

or a pharmaceutically acceptable salt, ester, or solvate thereof.

8. A method for treating a cancer comprising administering to a patient in need thereof a therapeutically effective amount of the compound of claim 1, or a pharmaceutically acceptable salt, ester, or solvate thereof, or the pharmaceutical composition of claim 3.

9. The method of claim 8, wherein the cancer is a solid cancer or a non-solid cancer.

10. The method of claim 9, wherein the cancer is liver cancer, lung cancer, breast cancer, pancreatic cancer, colon cancer, cervical cancer, gastric cancer, prostate cancer, melanoma, or human osteosarcoma.

11. A method for inhibiting the proliferation of cancer cells comprising administering to a patient in need thereof a therapeutically effective amount of the compound of claim 1, or a pharmaceutically acceptable salt, ester, or solvate thereof.

12. The method of claim 11, wherein the cancer cells are selected from the group consisting of liver cancer cells, lung cancer cells, breast cancer cells, pancreatic cancer cells, colon cancer cells, cervical cancer cells, gastric cancer cells, prostate cancer cells, and human osteosarcoma cells.

* * * * *